United States Patent
Etheridge et al.

(10) Patent No.: US 11,067,196 B2
(45) Date of Patent: Jul. 20, 2021

(54) INTERNAL VALVE TRANSMITTER FLANGE

(71) Applicant: Rosemount Inc., Shakopee, MN (US)

(72) Inventors: Matthew Lee Etheridge, Chanhassen, MN (US); Trevor Thomas Stroth, Minneapolis, MN (US)

(73) Assignee: ROSEMOUNT INC., Shakopee, MN (US)

( * ) Notice: Subject to any disclaimer, the term of this patent is extended or adjusted under 35 U.S.C. 154(b) by 137 days.

(21) Appl. No.: 16/145,291

(22) Filed: Sep. 28, 2018

(65) Prior Publication Data
US 2020/0102973 A1    Apr. 2, 2020

(51) Int. Cl.
*F16K 31/50*   (2006.01)
*F16K 1/02*    (2006.01)

(52) U.S. Cl.
CPC ............... *F16K 31/50* (2013.01); *F16K 1/02* (2013.01)

(58) Field of Classification Search
CPC ... F16K 1/04; F16K 1/02; F16K 24/04; F16K 31/50
See application file for complete search history.

(56) References Cited

U.S. PATENT DOCUMENTS

| | | | |
|---|---|---|---|
| 1,630,785 A | 5/1927 | Collins | |
| 3,164,308 A | 1/1965 | Marcovitch et al. | |
| 3,578,285 A | 5/1971 | Carlton | |
| 6,273,398 B2 * | 8/2001 | Lloyd | F16F 9/43 137/901 |
| 7,721,764 B2 * | 5/2010 | Louwagie | F16K 1/04 137/597 |
| 9,506,569 B2 * | 11/2016 | Moren | F16K 1/04 |
| 2012/0132839 A1 | 5/2012 | Moren | |

FOREIGN PATENT DOCUMENTS

| | | |
|---|---|---|
| CN | 209570288 | 12/2018 |
| DE | 1 949 198 | 4/1971 |
| DE | 81 21 838 U1 | 11/1981 |
| DE | 195 11 525 | 10/1996 |
| EP | 1 512 916 | 3/2005 |
| WO | WO 2008/045193 | 4/2008 |

OTHER PUBLICATIONS

Notification of Transmittal of the International Search Report and the Written Opinion of the International Searching Authority from International Application No. PCT/US2019/037938, dated Sep. 13, 2019.
Office Action from Chinese Patent Application No. 201811596685.5, dated Jan. 27, 2021.

* cited by examiner

*Primary Examiner* — Eric Keasel
(74) *Attorney, Agent, or Firm* — Westman, Champlin & Koehler, P.A.

(57) ABSTRACT

A transmitter flange includes a flange body having a valve opening therein, the valve opening having a valve seat, and an internal valve configured to be retained in the valve opening. A retaining ring may be configured to thread into the valve opening to further retain the internal valve within the opening.

17 Claims, 9 Drawing Sheets

INTERNAL VALVE TRANSMITTER FLANGE

BACKGROUND

This disclosure relates to a pressure transmitter flange having an internal drain valve configuration. More particularly, the present disclosure relates to providing a higher working pressure valve that is less subject to damage than traditional external valves.

Existing designs of traditional and coplanar flanges for pressure transmitters use an external drain vent valve that is at risk of process leaks and is only capable of burst pressures at a welded seat up to approximately 21,000 pounds per square inch (PSI). As process pressures continued to increase, higher pressure ratings are in demand. Further, existing valve configurations are welded into flanges, and are subject to explosive failure, especially after repeated use.

SUMMARY

In one embodiment, a transmitter flange includes a flange body having a valve opening therein, the valve opening having a valve seat and internal threads. An internal valve is configured to be retained in the valve opening. The internal valve has external threads configured to thread into the internal threads to retain the internal valve in the valve opening.

In another embodiment, a transmitter flange includes a flange body having a valve opening therein, the valve opening having a valve seat, and an internal valve configured to be retained in the valve opening. A retaining ring is configured to thread into the valve opening to further retain the internal valve within the opening.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION OF ILLUSTRATIVE EMBODIMENTS

Figure 1:
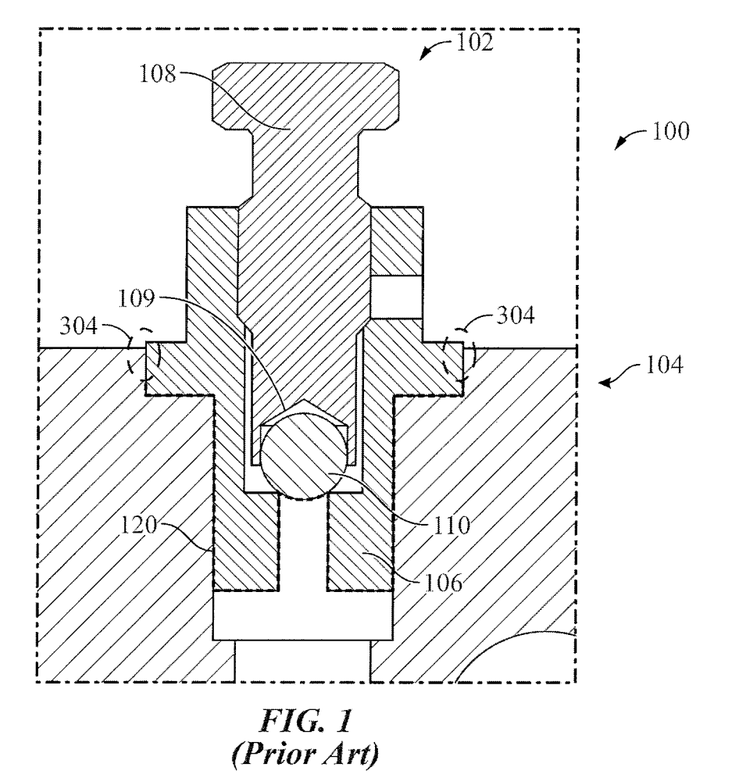
FIG. 1 is a sectional view of an external drain valve flange configuration.
Figure 2A:
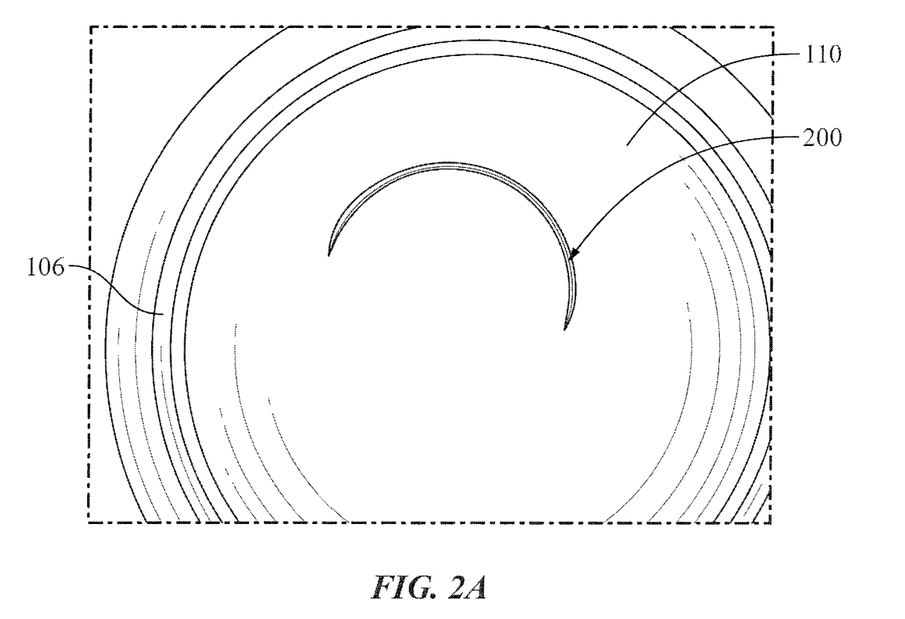
FIG. 2A is a view of a damaged ball of an external drain valve configuration.
Figure 2B:
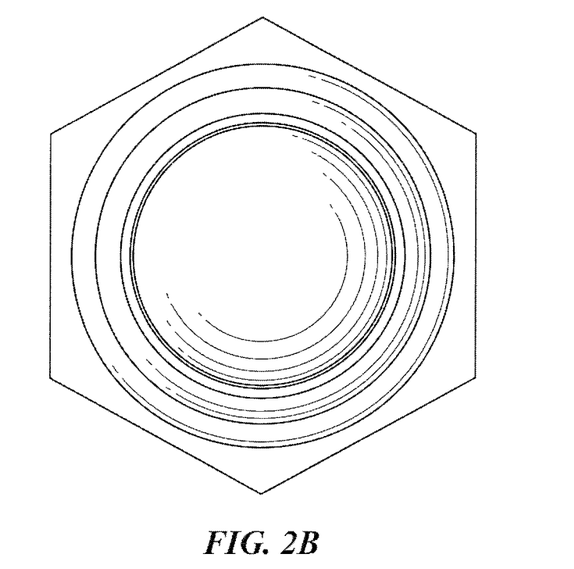
FIG. 2B is a view of an undamaged ball of an external drain valve configuration.

FIG. 1 is a cross-section diagram of an existing valve stem and seat assembly 100. Assembly 100 comprises an external valve 102 in a flange 104. External valve 102 comprises a valve seat 106 and a valve stem body 108. The valve 102 has a valve ball 110 (typically stainless steel such as 316 SST) that is crimped in a position between valve seat 106 and valve stem body 108. When the valve stem body 106 is tightened, the valve ball 110 plastically deforms the valve seat 106 to provide a rounded formed seal. As the valve ball 110 deforms the valve seat 106, the portion 109 of the valve stem body 108 that presses against the valve ball 110 can cut into the valve ball 110, especially if burrs or other sharp edges are present on the portion 109 of the valve stem body 108 that contacts the valve ball 110. Cuts or scratches can lead to process leaks even when the valve stem body 108 is fully tightened. Further, with use, and especially after many uses, the valve ball 110 can wear down, which can also lead to potential process leaks. Cuts or scratches 200 in a valve ball 110 are shown in greater detail in FIG. 2A. An unscratched valve ball 110 is shown in FIG. 2B.

Figure 3:
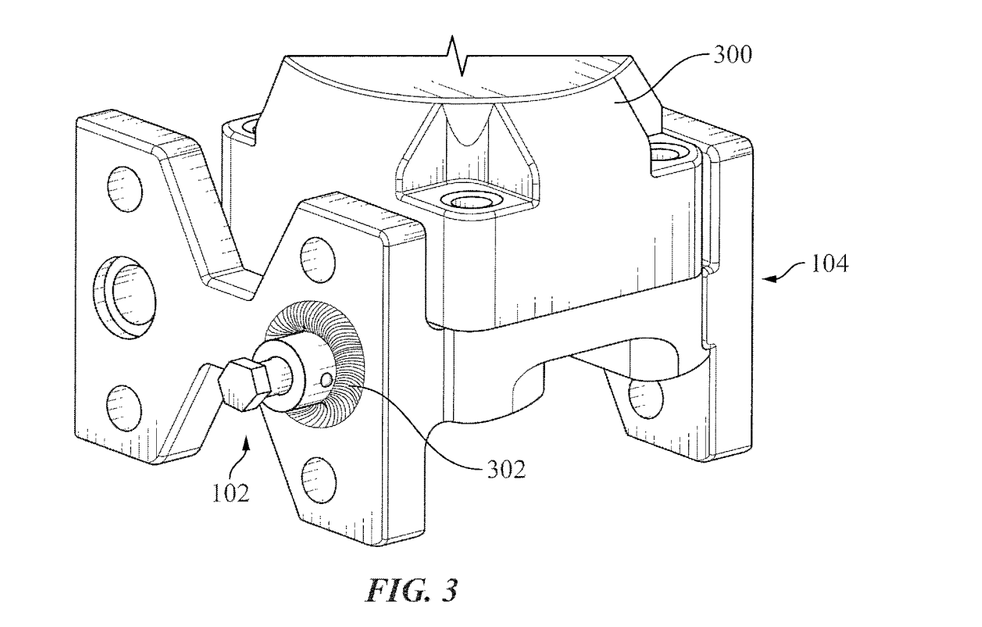
FIG. 3 is a perspective view of an external drain valve flange in place on a pressure transmitter.
Figure 4A:
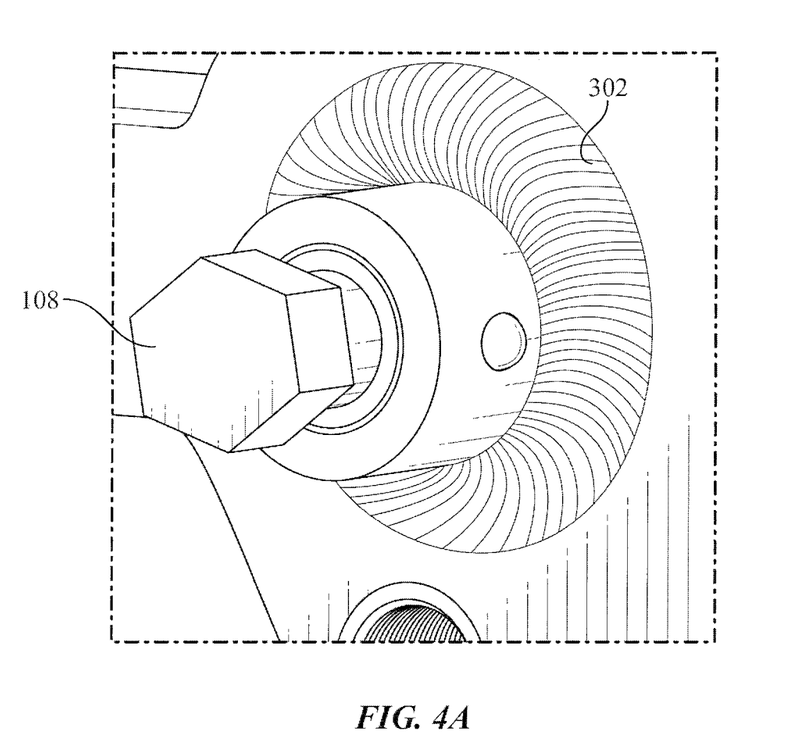
FIG. 4A is a more detailed view of a weld for an external drain valve flange.
Figure 4B:
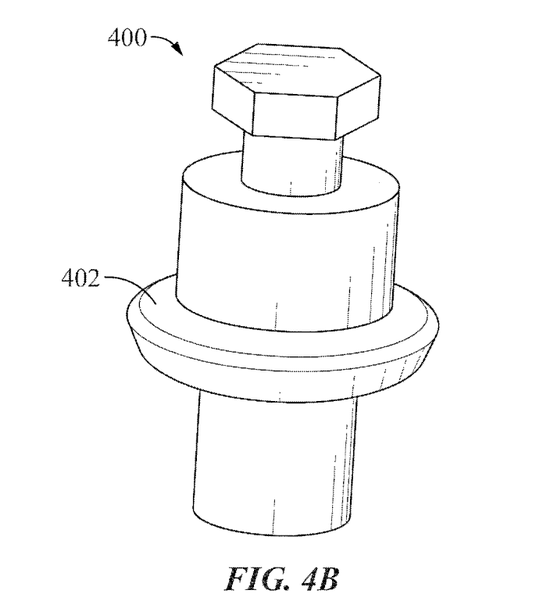
FIG. 4B is a view of a damaged external drain valve.

FIG. 3 shows a flange 104 having an external valve 102 in place on a pressure transmitter 300. External valves such as valve 102 are welded to the flange 104 with a weld 302 at weld joint 304 between the valve 102 and the flange 104 (see also FIG. 1). A close-up view of a representative weld 302 is shown in greater detail in FIG. 4A. A transmitter 300 having a flange 104 with a welded vent drain valve 102 is limited in working pressure by the weld joint, which is the weak link in the coupling of the valve 102, flange 104, and transmitter 300. During a hydrostatic pressure test, the welded valve 102 joint 304 will be the first component of the system 100 to fail. Typical valve welds 302 will fail at the welded joint at pressures of around 21,000 pounds per square inch (PSI). When such a failure of a weld 302 occurs, the resulting pressure release can cause a projectile displacement of the valve stem body 108 or portions thereof, as well as weld material. This type of failure results in high speed projectiles that can be very dangerous. A projectile portion 400 of a valve 102 is shown in FIG. 4B. Weld failure has occurred at 402.

Modern process pressures can reach 24,000 PSI or more. Typical welded solutions cannot provide security and reliability at those pressures.

Figure 5A:
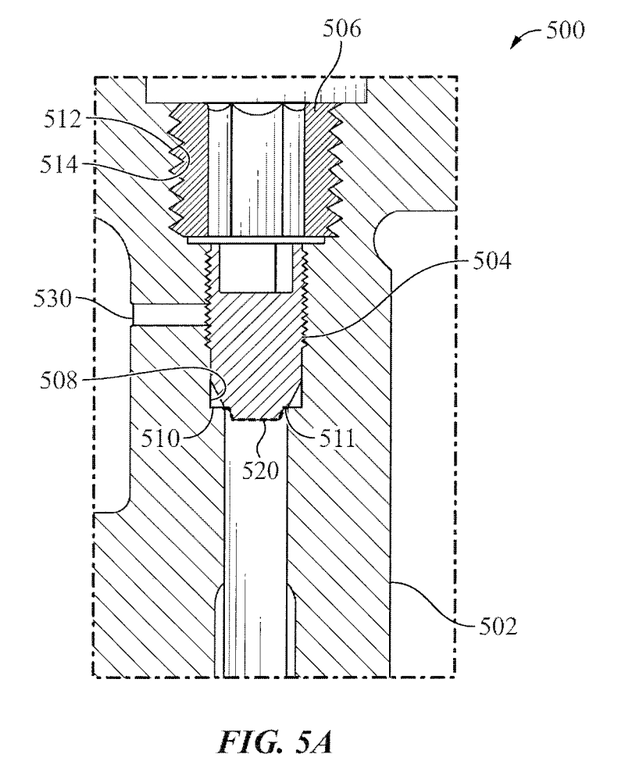
FIG. 5A is a sectional view of an internal drain valve and flange according to an embodiment of the present disclosure.
Figure 5B:
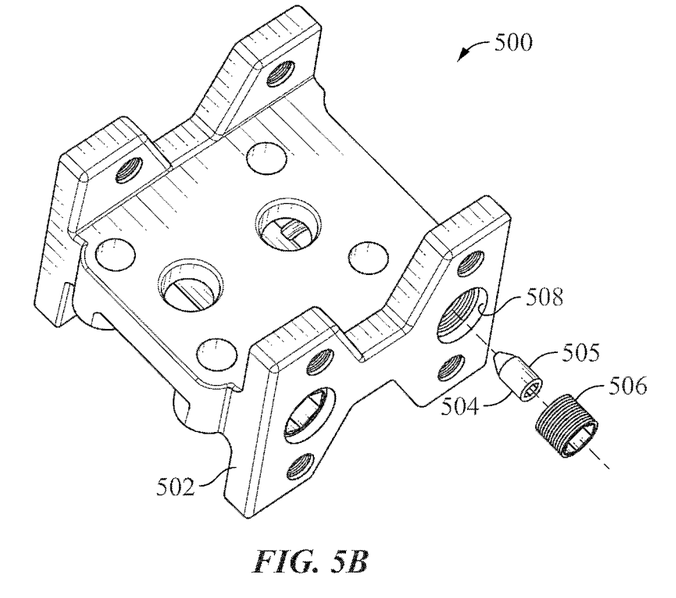
FIG. 5B is an exploded perspective view of an internal drain valve, flange, and retaining ring according to an embodiment of the present disclosure.

An internal valve flange 500 according to an embodiment of the present disclosure is shown in FIGS. 5A and 5B. Flange 500 is directed toward an internal drain valve to be used on pressure transmitter flanges. Internal valve solutions according to embodiments of the present disclosure provide improved valve reliability and increased pressure rating. Embodiments of the internal valve flange do not use any welding, reduce the amount of parts used to provide a seal, provide additional safety features, and are easily installed with standard hex Allen wrenches.

Flange 500 comprises a flange body 502, an internal valve stem 504 that is internal to flange body 502, and retaining ring 506 configured to retain the internal valve stem 504 within flange body 502. Flange body 502 has an opening 508 that is sized to accommodate the internal valve stem 504, and has a valve seat 510 within the opening. Flange body 502 and internal valve stem 504 are each formed of metal, and the interface between flange body 502 and internal valve stem 504 is a metal on metal seal between seating surface 511 of internal valve stem 504 and valve seat 510. Such a seal, at the process pressure retaining area 520 in opening 508 has no ball such as ball 110, and no significant plastic deformation that would be enough to cause leaks, providing a leak tight seal at a wide range of pressures, including pressures higher than the ball valve shown in FIG. 1.

from that of the valve of FIG. 1 and therefore the force exerted on the valve by the process pressure is also reduced. Referring back to FIG. 1, the external valve solution shown there has a process pressure retaining area indicated at 120. This process pressure retaining area 120 is significantly larger than the process pressure retaining area shown in flange 500.

Pressures and areas of the typical external valve such as that shown in FIG. 1 versus the internal valve as shown in FIGS. 5A and 5B are shown in Table 1. For the external valve, the pressure retaining area 120 is about 0.423 in$^2$. With a process pressure of 20,000 PSI, the force due to that pressure is almost 8.500 pound-feet (lbf). This pressure directly stresses the weld over the weld area of 0.127 in$^2$, resulting in 66,600 PSI on the weld. Welds of typical strength are not sufficient to retain such pressures, and are prone to fail.

TABLE 1

|  | External Valve | Internal Valve |
| --- | --- | --- |
| A = Pressure Retaining Area = ¼π D$^2$ | ¼π (.734)$^2$ = .423 in$^2$ | ¼π (.188)$^2$ = .028 in$^2$ |
| $P_P$ = Process Pressure = 20,000 PSI | 20,000 PSI | 20,000 PSI |
| $F_P$ = Force due to pressure = ($P_P$)(A) | 20,000 psi * .423 in$^2$ = 8,460 lbf | 20,000 psi * .028 in$^2$ = 560 lbf |
| Stress on Weld = $F_P$/(Area of Weld) | 8460 lbf/.127 in$^2$ = 66,600 PSI | — |
| Stress on Threads = $F_P$/(Area of threads) | — | 560 lbf/.058 in$^2$ = 9,700 PSI |

In one embodiment, flange body opening 508 is threaded with internal threads to threadedly accommodate internal valve stem 504. In this embodiment, internal valve stem 504 has external threads that thread into internal threads to secure the internal valve stem 504 within opening 508. Internal valve stem 504 in one embodiment includes a hex opening to allow a standard hex Allen wrench to be used for threading the internal valve stem into opening 508. The opening 508 is sized in one embodiment so that internal valve stem 504 is recessed in flange opening 508 when it is seated at the valve seat 510. The recessed internal valve stem protects the valve from being disturbed unintentionally while in operation.

Flange opening 508 is in one embodiment further threaded to threadedly accommodate retaining ring 506 to hold valve stem 504 in place. In this embodiment, valve stem 504 may not be threaded into opening 508, but retained with retaining ring 506. Alternatively, the valve stem 504 may be threaded into opening 508, and further retained by threaded retaining ring 506.

Figure 6:
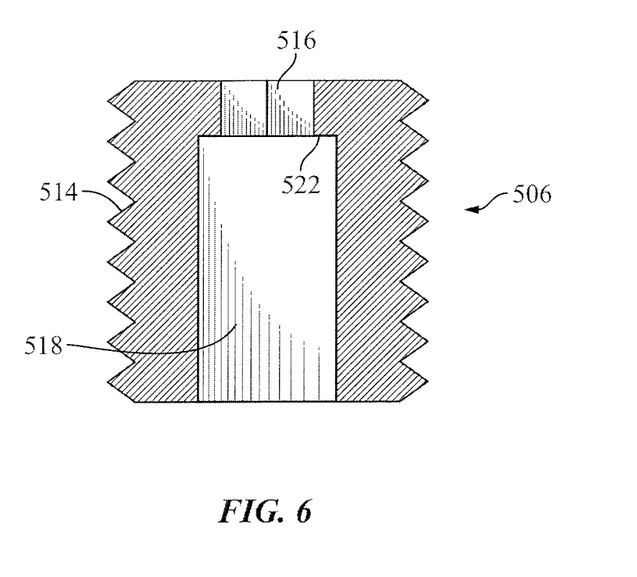
FIG. 6 is a sectional view of a retaining ring according to an embodiment of the present disclosure.

Further details of retaining ring 506 are shown in FIG. 6. In one embodiment, retaining ring 506 has external threads 514 that match internal threads 512 of opening 508, a hex opening 516, and an internal valve stem opening 518. The internal valve stem opening 518 has a lip 522 in opening 518 against which internal valve stem 504 is retained when the retaining ring 506 is threaded into flange opening 508. Hex opening 516 is configured in one embodiment to allow a standard hex Allen wrench to be used to tighten retaining ring 506 within flange opening 508. It should be understood that other tightening shapes may be used without departing from the scope of the disclosure. When the internal valve stem 504 is threaded, the valve can be operated without the retaining ring 506 in place.

Internal valve stem 504 seals with flange 502 at valve seat 510. The process pressure retaining area of flange 500 depends on the area 520 of the seal. The surface area of the valve which retains process pressure is significantly reduced In contrast, the pressure retaining area 520 is about 0.028 in$^2$. With the same process pressure of 20,000 PSI, the force due to pressure is about 560 lbf. The threads of the internal valve stem 504 or the retaining ring 506, or combination thereof are the area that take this pressure in the embodiment of FIGS. 5A and 5B. With a thread area of about 0.058 in$^2$, the stress on the threads is reduced to about 9,700 PSI.

In one embodiment, the materials of the flange 500 are made of 316 SST and the yield strength of the parts will be around 65,000 PSI. Based on the pressure calculations, at a process pressure of 20,000 PSI the external valve design will start to yield (66,600 PSI>65,000 PSI). The flange internal valve embodiment remains well below the yield point (9,700 PSI<65,000 PSI). Embodiments of the present disclosure have a higher working pressure limit than external, welded valves and flanges, while also reducing the number of parts, complexity, and offer simpler installation.

Figure 7:
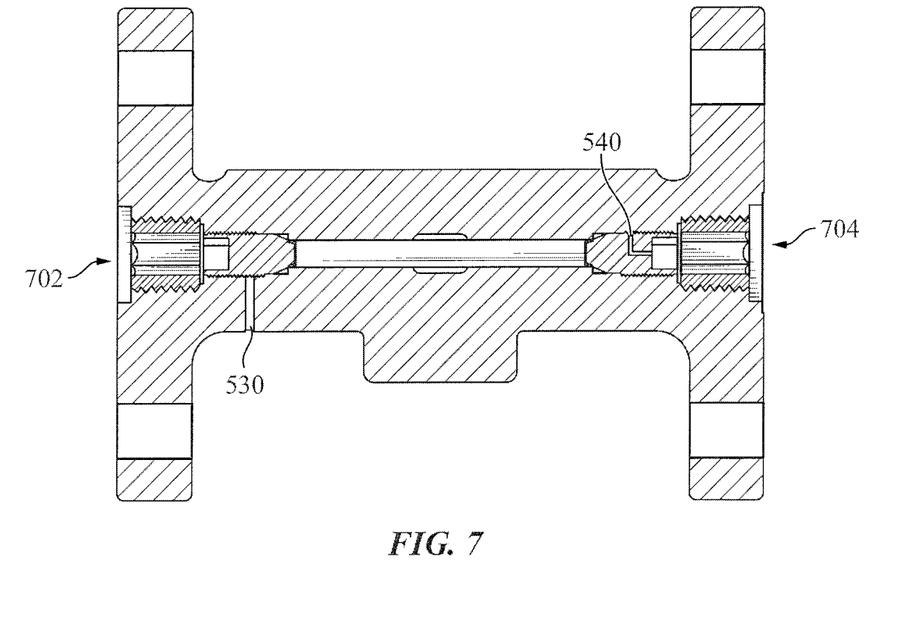
FIG. 7 is a sectional view showing two different vent/drain holes according to embodiments of the present disclosure.

Internal valve flange 500 is in one embodiment provided with a vent/drain hole 530 in the flange body 502 as shown in FIG. 5 and on the left side valve 702 of FIG. 7. Alternatively, a vent/drain hole 540 is provided in the internal valve stem 504 as shown on the right side valve 704 of FIG. 7.

Figure 8A:
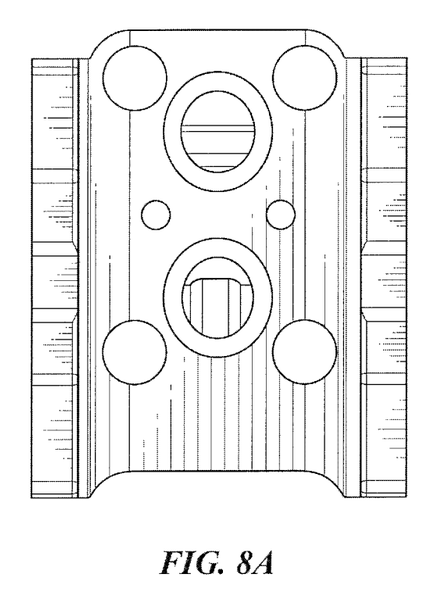
FIG. 8A is a top view of a flange having an internal valve according to an embodiment of the present disclosure.
Figure 8B:
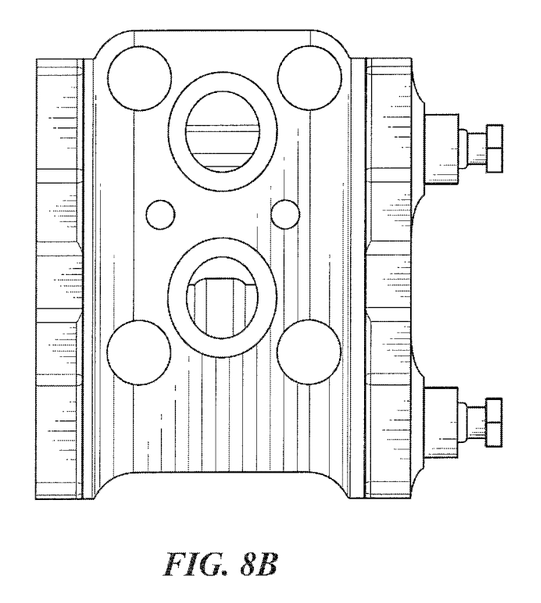
FIG. 8B is a top view of a flange having an external valve.

A top view of a flange such as flange 500 is shown in FIG. 8A. A top view of a typical external valve flange of FIG. 21 is shown in FIG. 8B. The flange of FIG. 8A is more sleek, with no external parts that could be subjected to damage through dropping or the like.

Figure 9:
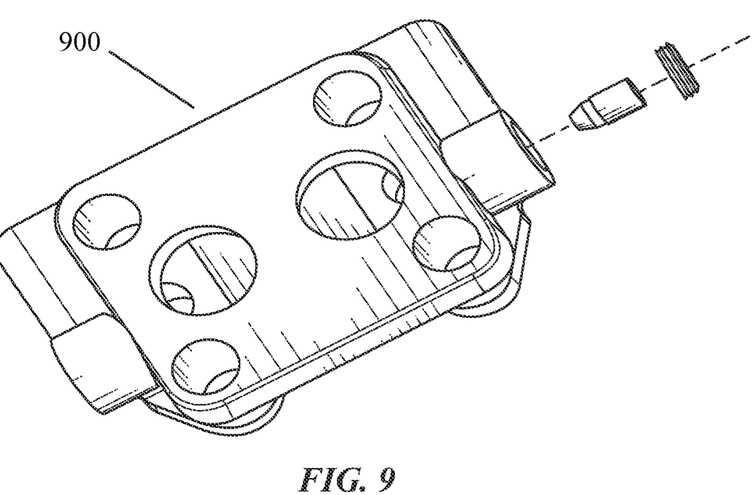
FIG. 9 is a perspective view of a coplanar flange having an internal valve according to an embodiment of the present disclosure.

As shown in FIG. 9, embodiments of the present disclosure may be used with a coplanar flange 900. In this embodiment, an external threaded vent/drain valve used with coplanar flanges may be replaced with the internal threaded valve described herein.

Figure 10A:
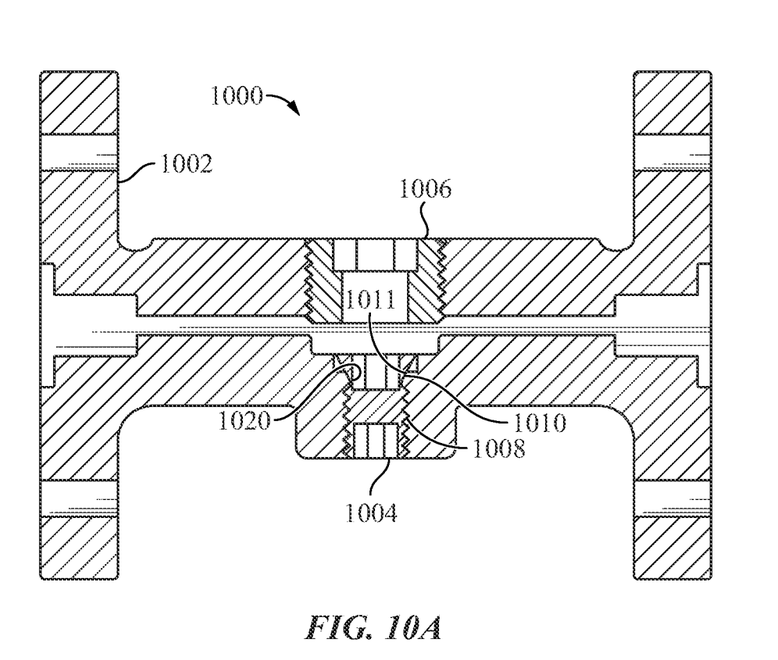
FIG. 10A is a side sectional view of a flange with an internal pressure energized valve configuration according to an embodiment of the present disclosure.
Figure 10B:
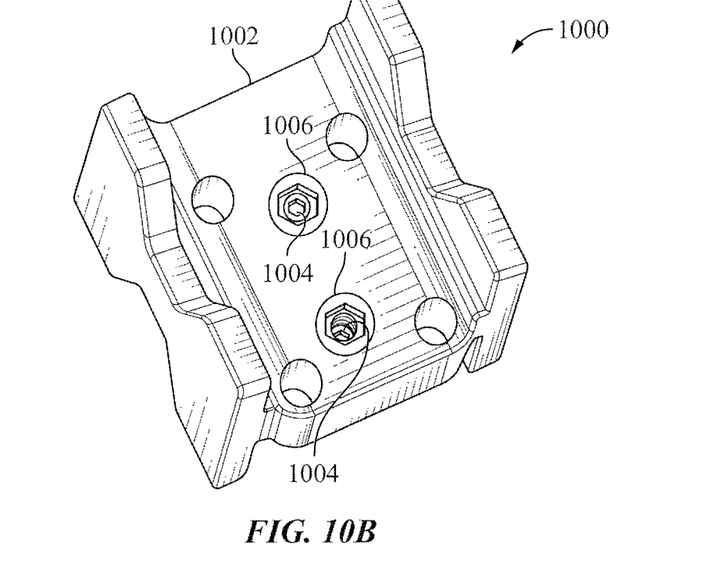
FIG. 10B is a perspective view of the flange of FIG. 10A.
Figure 10C:
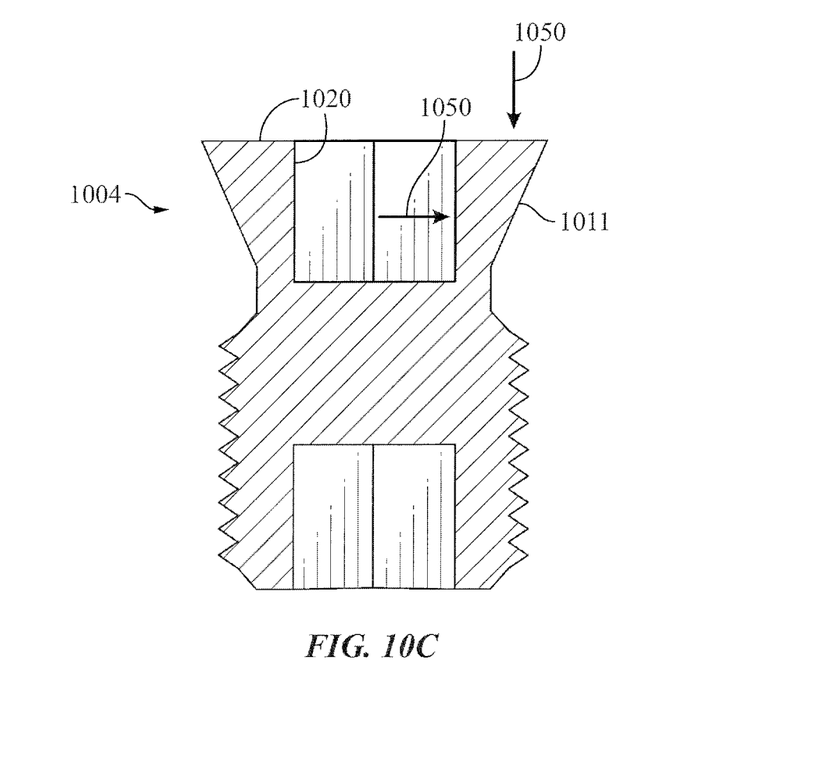
FIG. 10C is a side sectional view of a valve stem as used in the embodiment of FIG. 10A.

As shown in FIGS. 10A and 10B in side cross section and perspective views, respectively, an internal valve such as that described herein may be used to vent through a bottom of a traditional flange. Flange 1000 has internal valve stem 1004 in opening 1008 of flange body 1002, retained by retaining ring 1006. This embodiment leaves process connections available on the flange 1000. The valve of this embodiment has a relatively large amount of surface area 1020 exposed to process pressure 1050, as shown in FIG. 10C. Process pressure is exerted which exerts an outward/downward force on the stem, pressing stem 1004 into the valve seat 1010 at seating surface 1011.

Figure 11:
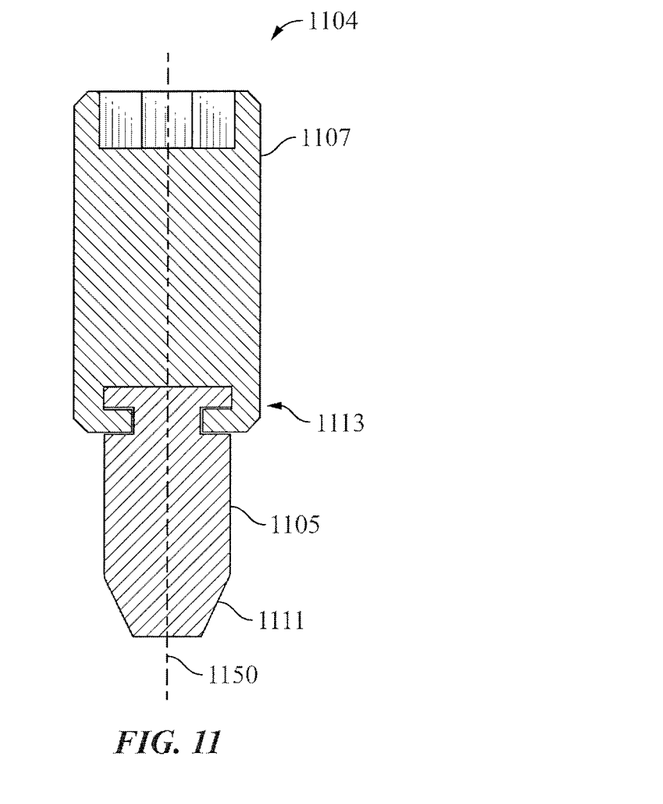
FIG. 11 is a side sectional view of an internal valve according to another embodiment of the present disclosure.

Another embodiment of a valve stem 1104 with a non-rotating stem portion 1105 and a rotating stem joint 1107 is shown in FIG. 11. Non-rotating stem portion 1105 has a seating surface 111 which seats against a valve seat such as valve seats 510, 1010 discussed herein. The non-rotating stem 1105 does not spin about axis 1150. The rotating stem joint 1107 is rotatably coupled to non-rotating stem portion 1105 at joint 1113. The rotating stem joint 1107 is threaded for threading the valve stem 1104 into an opening such as opening 508, 1008 discussed herein. During installation, the non-rotating stem portion 1105 travels along the axis 1150, but does not rotate about the axis 1150. This reduces potential wear on the sealing surface 1111.

Although the present invention has been described with reference to preferred embodiments, workers skilled in the art will recognize that changes may be made in form and detail without departing from the spirit and scope of the invention.

What is claimed is:

1. A transmitter flange, comprising:
   a flange body having a valve opening therein, the valve opening having a valve seat and internal threads and extending from a first face of the flange body into the flange body; and
   a transmitter mounting face on the flange body configured to mount to a pressure transmitter and couple a process pressure to the pressure transmitter;
   an internal valve configured to be fully retained entirely within the valve opening and the flange body, the internal valve having external threads configured to thread into the internal threads to fully retain the internal valve entirely within the valve opening;
   a retaining ring configured to thread into the valve opening to further retain the internal valve within the opening;
   wherein a stem of the internal valve comprises:
      a non-rotating stem portion having a seating surface configured to engage the valve seat, the non-rotating stem portion slidably engaged in the valve opening;
      a rotating stem joint, rotatably coupled to the non-rotating stem portion, the rotating stem joint threaded for retention in the threaded valve opening; and
      wherein the internal valve is configured such that the stem is pressure energized by process fluid on the valve stem when the flange is coupled to a process.

2. The transmitter flange of claim 1, wherein the valve opening is at a side of the flange body.

3. The transmitter flange of claim 1, wherein the internal valve has a valve seating surface, the valve seating surface and the valve seat being formed of metal, and forming a metal on metal seal therebetween when the internal valve is retained in the valve opening.

4. The transmitter flange of claim 1, wherein the internal valve is fully recessed into a face of the flange body when retained therein.

5. The transmitter flange of claim 1, wherein the flange is a coplanar flange.

6. The transmitter flange of claim 1, wherein the internal valve has a drain hole machined therein.

7. The transmitter flange of claim 1, wherein the flange body has a drain hole machined therein between the valve opening and an external surface of the flange body.

8. The transmitter flange of claim 1, wherein the valve opening is through a center of the flange body.

9. The transmitter flange of claim 1, wherein the internal valve has a hex opening configured to facilitate threading the internal valve into the valve opening.

10. A transmitter flange, comprising:
    a flange body having a valve opening therein, the valve opening having a valve seat and extending from a first face of the flange body into the flange body;
    a transmitter mounting face on the flange body configured to mount to a pressure transmitter and couple a process pressure to the pressure transmitter;
    an internal valve configured to be retained in the valve opening;
    a retaining ring configured to thread into the valve opening to further retain the internal valve within the opening;
    wherein a stem of the internal valve comprises:
       a non-rotating stem portion having a seating surface configured to engage the valve seat, the non-rotating stem portion slidably engaged in the valve opening;
       a rotating stem joint, rotatably coupled to the non-rotating stem portion, the rotating stem joint threaded for retention in the threaded valve opening; and
       wherein the internal valve is configured such that the stem is pressure energized by process fluid on the valve stem when the flange is coupled to a process.

11. The transmitter flange of claim 10, wherein the retaining ring comprises a hex opening configured to facilitate threading the retaining ring to the valve opening.

12. The transmitter flange of claim 10, wherein the valve opening is at a side of the flange body.

13. The transmitter flange of claim 10, wherein the internal valve has a valve seating surface, the valve seating surface and the valve seat being formed of metal, and forming a metal on metal seal therebetween when the internal valve is retained in the valve opening.

14. The transmitter flange of claim 10, wherein the internal valve is recessed into a face of the flange body when retained therein.

15. The transmitter flange of claim 10, wherein the flange is a coplanar flange.

16. The transmitter flange of claim 10, wherein the internal valve has a drain hole machined therein.

17. The transmitter flange of claim 10, wherein the flange body has a drain hole machined therein between the valve opening and an external surface of the flange body.

* * * * *